United States Patent Office

2,992,103
Patented July 11, 1961

2,992,103
PHOTOGRAPHIC TRANSFER-REVERSAL PROCESSES UTILIZING SCREEN MEMBERS
Edwin H. Land, Cambridge, and Otto E. Wolff, Weston, Mass., assignors to Polaroid Corporation, Cambridge, Mass., a corporation of Delaware
Filed Apr. 1, 1955, Ser. No. 498,673
24 Claims. (Cl. 96—29)

This invention relates to photographic processes and products especially useful in carrying out practices wherein a stratum of a photosensitive material is exposed through a screen member, i.e., a lenticular screen or an additive color screen, and an image provided or formed in an individual layer, which is separate from said screen, is viewed or projected for viewing by means of light directed through the same screen member.

As is well known, lenticular type screen members are employable in the photographic art for providing additive color images and also for providing stereoscopic images while screen members having minute red, blue and green filters as the screen elements thereof are employable for providing additive color images. In all photographic processes employing a screen member in conjunction with taking and viewing, it is essential in obtaining high resolution and image quality to hold the screen member in registered relation with the photosensitive layer while exposing said layer and to maintain such a screen member in substantially similar if not identical registration with a layer which contains the image to be viewed or projected through the screen member.

These registration problems become complicated in instances wherein a photosensitive layer is exposed through a screen layer which is at least initially separate or out of contact with the photosensitive layer or which may be kept in spaced relation to the photosensitive layer, and especially in instances wherein the final image record is obtained by reversal processes which require a diffusion of components from one layer to another. Nevertheless, certain definite advantages are realized by maintaining this separation of the screen and photosensitive materials since it permits the use of such materials in the form in which they are marketed, without special modification thereof, and allows the application of a processing liquid between the photosensitive material and the screen to obtain the desired image record.

The present invention has for its aims and objects improved processing procedures designed to assure the establishment and maintenance of a high degree of registration between a screen member and a photosensitive layer which is exposed through a screen member such as a lenticular screen or additive color screen as a separate layer and the formation in a product of this nature of a visible image which is viewed or projected for viewing through said screen member.

In effecting these novel procedures, the invention embraces as further objects the concepts of providing a layer of a liquid processing composition between an unexposed photosensitive silver halide layer or stratum and a screen member, the use of the processing liquid to maintain a sandwich type structure with said photosensitive layer and said screen member held in superposed and predetermined registration to each other as well as a sandwich structure which includes a print-receiving layer or stratum registered with said photosensitive layer and said screen and located adjacent that surface of said screen member which is the nearer to said photosensitive layer, and also the concepts involving the photoexposure of the photosensitive layer through the screen member after the formation of this sandwich type structure and the employment of the processing liquid to carry out the development of an image in the photosensitive layer and including processing wherein a reversal image, which is viewable through said screen member, is formed in said print-receiving layer.

Additional objects of the invention comprise the concept of providing a sandwich structure in the form of a strippable lamination and the separation, after transfer image formation, of the screen member and print-receiving layer together as a unit from the photosensitive layer, as well as the concept of providing a transfer image which possesses a density of an order of 5 or 6 times greater than that possessed by the silver image developed in the photosensitive layer whereby the high covering power of the silver of the reversal image may be utilized to permit continued maintenance of the sandwich type structure for viewing or projection purposes.

Further objects of the invention are to provide photographic transfer-reversal processes of the character described wherein the transfer image is formed at least in part in the layer of processing liquid and/or in a layer or stratum of image-receptive material supported on the screen member or in the screen member and wherein the layer of processing liquid is provided between the photosensitive layer and screen member by any suitable practice, as well as to processes of the general nature set forth which may be carried out with readily available negative film and with screen members of the lenticular type or additive color type of conventional construction which are capable of simple modification to provide a print-receiving layer on one surface thereof.

Still further objects of the invention are to provide novel products for carrying out photographic processing of the character heretofore set forth and especially to provide a product having a plurality of layers and comprising a screen layer of the lenticular type or of the additive color type such as a color mosaic, a photosensitive layer and a rupturable container holding a processing liquid and with the screen layer, the photosensitive layer and the container of said product being arrangeable in predetermined superposed and registered relation so that the photosensitive layer is exposable through the screen layer and said container is positioned between the photosensitive layer and the screen layer, and wherein said product includes all of the processing materials needed to form a visible image therein with said processing liquid being adapted to render said processing materials effective upon its release while forming, between the photosensitive layer and the screen layer, a stratum of an image-receptive material which provides means for holding said layers in said superposed and registered relation and which becomes so attached to said screen layer as to permit said stratum to be separated from the photosensitive layer as a unit together with said screen layer.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 shows diagrammatically and in section the photographic processing, as carried out by this invention, of a film unit having a positive or print-receiving assembly comprising a preformed print-receiving layer carried on one surface of a screen type of member, which is shown as a lenticular member but which may be an additive color screen member, and with the film unit at that stage of processing wherein a layer of processing liquid has been provided between the overlying faces of the negative or photosensitive assembly and the print-receiving assembly and the film unit is undergoing exposure prior to silver development and transfer image formation;

Figure 1:
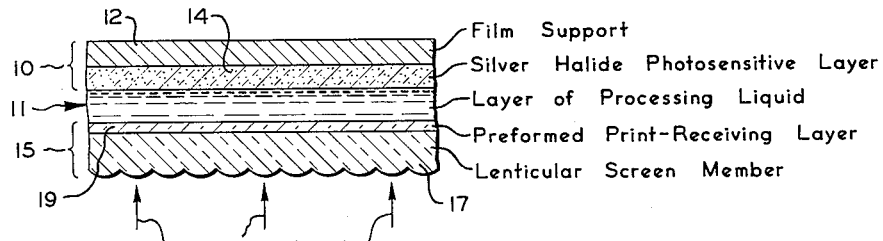
Figure 3:
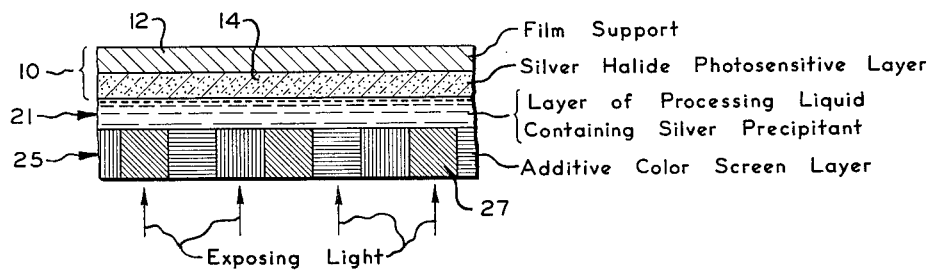
FIG. 3 is a diagrammatic view similar to FIG. 1 but illustrating an embodiment of the invention wherein transfer image formation occurs in the layer of processing liquid, this embodiment being shown in conjunction with a film unit comprising as the second sheet assembly thereof an additive color screen type of member but for which a lenticular screen member may be substituted.
Figure 4:
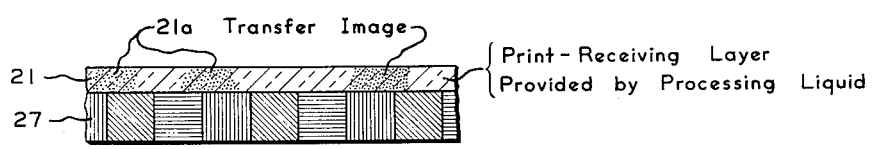
Figure 5:
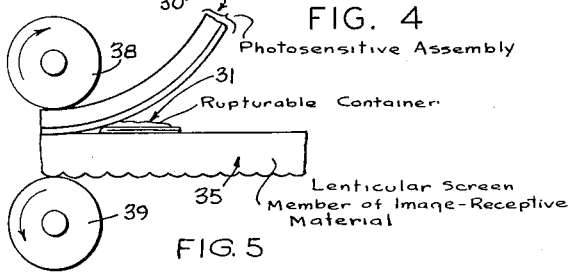

FIG. 4 is a view of the transparency obtained by carrying out the practices illustrated in FIG. 3 in instances where the screen member and the liquid layer are separated as a unit from the photo-sensitive layer and the transfer image is provided at least in part in the layer of processing liquid; and FIG. 5 is a diagrammatic side elevation showing a processing mechanism for and in conjunction with a film unit which embodies a rupturable container holding a processing liquid, and while specifically illustrative of a film unit having a screen member capable of having a transfer image formed therein, is also illustrative of a film unit construction available for associating a container with the film units disclosed in FIGS. 1 and 3.

In the preferred embodiments of this invention, photographs are formed by transfer-reversal techniques carried out in conjunction with a silver halide photosensitive layer and a screen having an array of minute optical elements in the nature of a color mosaic as provided in an additive color type of screen or of optical lenses of predetermined surface curvatures as provided in a lenticular type of screen. While, as will hereinafter be pointed out, these practices may be varied by the use of photosensitive materials other than silver halide and by the formation of other than silver images, as well as by the provision of a reversal image in a photosensitive layer, the reversal-transfer processing of silver halide has been made the subject of illustration since it emphasizes the broad concepts of this invention which make it possible to carry out a screen process without specially prepared screen members which include negative material integral therewith whereby screen processes may be practiced with commercially available photographic materials.

In this regard, a film unit provided with a lenticular type of screen member and useful for carrying out an additive color process or a stereoscopic process by silver halide transfer is illustrated in FIG. 1 in conjunction with the practices of this invention which proceed by forming a sandwich type structure comprising a pair of liquid-confining layers constituted in FIG. 1 by a photosensitive assembly 10 and a print-receiving assembly 15 secured together in overlying relation by means of an alkaline processing liquid provided in a layer 11 between said assemblies. Following formation of the sandwich, the photosensitive assembly thereof is preferentially exposed by light directed through the outer surface of the print-receiving assembly as shown in FIG. 1.

The layer 11 is an alkaline processing liquid comprising an alkaline solution of a silver halide developer and a silver halide transfer agent which is preferably thickened by the addition thereto of a suitable agent or material capable of increasing the viscosity of the liquid and of enhancing its ability to hold the photosensitive and print-receiving layers in predetermined registration.

The photosensitive assembly 10 comprises a conventional film support 12 of paper or of plastic and may be either transparent or opaque. Film support 12 carries a photosensitive layer or stratum 14 comprising a suitably color-sensitive silver halide gelatin emulsion such, for example, as a panchromatic emulsion.

In the embodiment of film unit disclosed in FIG. 1, the print-receiving assembly 15 employes a lenticular screen member or layer 17 which is transparent and provides means for supporting a transfer image. FIG. 1 shows a layer or stratum 19 of an image-receptive material as provided on the inner surface of the screen member 17, i.e., that surface of screen member 17 which is directly overlaid by the photosensitive assembly 10 of the sandwich structure. The assembly 15 of FIG. 1 employs a construction, as will appear, which is specially suited for restricting transfer image formation therein to the print-receiving layer 19.

Suitable image-receptive materials for the layer 19 comprise clear gelatin, polyvinyl alcohol and other transparent materials wherein a transfer image may be formed and including a matrix of a water-insoluble inorganic adsorbent substance such as silica. Image-receptive materials of this nature may be applied as a coating onto the surface of the screen member 17. Preferably, suitable silver precipitating agents such as the metallic sulfides and selenides of heavy metals are incorporaed in the print-receiving layer 19.

To assure separation of the liquid 11 from the print-receiving layer, it may at times be desirable to utilize a print-receiving layer comprising a stratum of an image-receptive material on the screen member 17 and a stratum of a stripping material which is superposed on the image-receptive stratum and to which the liquid 11 becomes adhered by a weaker bond than the bond between the liquid and the photosensitive layer 14. This practice is comprehended by the invention and examples of stripping materials comprise gum arabic, sodium alginate, pectin and others.

Print-receiving layers of the general nature set forth are described in U.S. Patent No. 2,543,181, issued on February 27, 1951, and in the copending application of Edwin H. Land, Serial No. 234,622, filed June 30, 1951.

The screen member or layer 17 is preferably formed of a transparent conventional film base material such as a cellulose ester or mixed ester, for example, cellulose nitrate, cellulose acetate or other materials which form a continuous film of a nature substantially impervious to the liquid 11. Film base materials of this nature may be provided with lenticules thereon by conventional practices, many such practices being set forth in "History of Color Photography," Joseph S. Friedman, chapter 17, American Photographic Publishing Company, Boston, 1944.

As a further alternative, the layer 19 may be dispensed with and the screen member 17 formed of an image-receptive material such as polyvinyl alcohol whereby transfer image formation may take place in the screen member. A print-receiving assembly 35, suitable for carrying out this concept, is schematically illustrated in FIG. 5. Likewise, the invention comprehends transfer image formation in both a print-receiving layer and a screen member in instances where the layer 19 and screen member 17 are in contact and the member 17 is permeable to the liquid 11.

A variety of practices is available for forming the sandwich type structure. For example, the photosensitive and print-receiving assemblies may be moved at similar rates along superposed paths. A roll coater mechanism is located in one of these paths to apply liquid in a layer 11 onto the appropriate face of that assembly which is moved in said path and as the coated assembly passes from this coating station, it is pressed into contact with the uncoated assembly moving in the other path. Alternatively, the liquid 11 may be applied by causing it to be spread between the photosensitive and print-receiving assemblies as they undergo superpositioning.

A more convenient practice, which is especially adapted for use in a camera and which is illustrated in FIG. 5, employs a film unit having similarly sized photosensitive and print-receiving assemblies 30 and 35 which are secured together at one end thereof by hinge means (not shown) whereby they may be brought into overlying and registered relation and between which and at a location adjacent the hinge means there is mounted a rupturable container 31 for the processing liquid needed to provide the liquid layer 11. The film unit of FIG. 5 is shown as being passed between superposed pressure-applying rolls 38 and 39 which are suitably driven by means (not shown) and which apply sufficient pressure to the film unit to rupture the container 31 and spread its liquid in a substantially uniform layer between the interfaces of the assemblies 30 and 35 while bringing these assemblies into superposed relation. Film units and containers of this general nature are disclosed in the previously mentioned U.S. Patent No. 2,543,181.

As previously mentioned in describing the specific views of the drawings, FIG. 5 is illustrative of a construction for a film unit which embodies a container and is available for use with the film units illustrated in FIGS. 1 and 3.

Camera means suitable for spreading a liquid in a layer between a photosensitive assembly and a print-receiving assembly and for then exposing the film unit are set forth in the copending application of Edwin H. Land, Serial No. 463,848, filed October 22, 1954. In this regard, the pressure roll mechanism may also function to actuate the camera shutter after the formation of the photosensitive and print-receiving assemblies into a sandwich structure and preferably the roll mechanism is so arranged as to delay exposure of the photosensitive layer 11 for a minute fraction of a second after the formation of the sandwich whereby to eliminate vibration or jarring of the camera during said exposure. Further delay of exposure is, of course, possible. However, exposure of a photosensitive layer preferably takes place soon enough after the layer has been contacted by the liquid processing composition so that substantially no desensitization of the photosensitive material takes place.

More specifically, a typical processing liquid of suitable alkalinity, i.e., a pH of at least 8 or 9, comprises a solution of a silver halide developer such as hydroquinone and a silver halide transfer agent such as sodium thiosulfate which is thickened to a viscosity ranging from 100 to 200,000 centipoises at 20° C. by the addition of an agent such as a water-soluble polymer, e.g., a plastic material such as sodium carboxymethyl cellulose, starch or gum or which is thickened by an agent such as a water-insoluble emulsifiable oil present in the liquid as the internal phase of a water-oil emulsion. A typical formulation of the processing solution comprises:

| | G. |
|---|---|
| Water | 1860 |
| Sodium carboxymethyl cellulose | 93.0 |
| Sodium sulfite | 78.0 |
| Sodium hydroxide | 54.6 |
| Sodium thiosulfate | 14.5 |
| Hydroquinone | 52.0 |
| Sodium sulfate | 52.0 |

It will be appreciated that the practices of this invention provide a solution to the heretofore mentioned registration difficulties. In this regard, the photosensitive and print-receiving assemblies are brought into overlying relation in suitable predetermined registration during formation of the sandwich structure and are held in this registration by reason of the cohesive and/or adhesive properties of the liquid in the layer of processing composition confined between them and in effect providing the sandwich filling. From the completion of the sandwich structure until separation of the print-receiving assembly therefrom, it is important to observe that the photosensitive and print-receiving assemblies are substantially held against longitudinal and lateral movement relative to each other and to the layer of processing liquid which itself is confined within the sandwich structure.

Thus, as illustrated in FIG. 1, the sandwich structure is formed and the desired registration is established at the time the photosensitive assembly is exposed. Subsequent to exposure, this registration is substantially maintained during silver development in the photosensitive assembly by means of the processing liquid and the diffusion of silver complexes in the liquid toward the print-receiving assembly for the deposit thereof in a layer located adjacent the inner surface of the screen member for transfer image formation. Furthermore, this registration may be maintained indefinitely if desired.

Emphasis is given to the importance of registration maintenance from the time of exposure and during and after processing or until separation of the print-receiving assembly from the sandwich structure by considering that screen members employ as many as 300, and preferably more, elements or lenticules per linear inch. Thus, even minute relative movement between the screen member, print-receiving layer and the photosensitive layer during exposure and processing will greatly magnify displacement of the transfer image with respect to the screen and lead to a serious breakdown in the resolution of the transfer image when viewed or projected through the screen.

Figure 2:
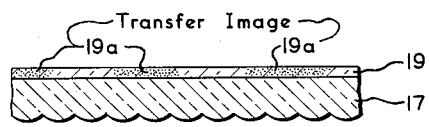
FIG. 2 is a diagrammatic view of the transparency obtained by carrying out processing of the film unit of FIG. 1 in instances where the screen type of member and the print-receiving layer carried thereon are separated as a unit from the photosensitive assembly and the liquid processing composition.

As previously pointed out, the film unit employed in conjunction with the practices of FIG. 1 is specially suited for the stripping away of the print-receiving assembly 15 from the photosensitive assembly 10 and the layer 11 of processing liquid. FIG. 2 illustrates such separation and shows layer 19 of the print-receiving assembly 15 as containing a silver halide transfer image 19a which is the reverse of the latent image formed in the photosensitive layer 14 by the exposure of the sandwich in FIG. 1.

Although not as preferred, the invention contemplates indefinite maintenance of the sandwich structure for viewing purposes following the formation of negative and positive images therein. The copending application of Edwin H. Land, Serial No. 265,413, filed January 8, 1952, and also the copending application of Edwin H. Land, Serial No. 466,889, filed November 4, 1954, disclose the formation of transfer-reversal images which possess a density of an order of 5 or 6 times greater than that possessed by the silver image developed in the photosensitive layer. As taught in the just-mentioned applications, the high covering power of the silver of the reversal image may be utilized to avoid separation of a sandwich type structure. Although the highlights of the reversal image will be grayed to some extent under conditions wherein the photosensitive and print-receiving layers are maintained in superposed relation, i.e., in a sandwich structure, the result is generally unobjectionable, particularly when the image-bearing product is to be projected.

Screen members which employ as the screen elements thereof either lenticules or filter media formed of red, blue and green filters may, from a generic standpoint, be considered as transparent layers provided on at least one surface thereof with means for modifying light transmitted therethrough and these light-modifying means may be characterized as comprising a gridlike arrangement of a multiplicity of minute optical elements. As pointed out, screen members utilizing filter elements of the appropriate colors may be substituted for the screen member 17 illustrated in FIG. 1 and processing of the nature heretofore described may be carried out to produce additive color prints by transfer-reversal methods.

With more specific reference to the employment of color screens, FIG. 3 discloses a film unit provided with a screen member having color filter elements. FIG. 3 is also representative of the inventive concept by which transfer image formation is caused to occur in the layer of processing liquid.

As illustrated in FIG. 3, a photosensitive assembly 10, similar to that described in connection with FIG. 1 and utilizing a conventional film support 12 and a color-sensitive silver halide photosensitive layer or stratum 14 is shown in superposed relation to a second sheet type of assembly 25 and formed into a sandwich structure by means of a layer 21 of processing liquid which is provided between the photosensitive and print-receiving assemblies.

In this embodiment of the invention, the second assembly 25 is disclosed as comprising an additive color screen member 27 having, respectively, red, blue and green elements. If desired, the screen member 27 may be mounted upon a suitable transparent support. Additive color filter screens of the type useful herein are described in Chapters 12 and 13 of the previously mentioned "History of Color Photography" by Joseph S. Friedman.

In accordance with the teachings in U.S. Patent No. 2,662,822, issued December 15, 1953, the processing liquid providing the layer 21 contains silver precipitating agents so that silver complexes transferred by diffusion from the photosensitive layer are, at least in part, reduced to silver in the layer 21 of processing liquid. When employing this procedure, the screen member 27 or at least the surface thereof in contact with the liquid 21 comprises a material to which the liquid 21 will adhere by a stronger bond than it will to the photosensitive layer 14. As an alternative practice, a stripping layer comprising a material having weak bonding qualities with respect to the processing liquid may be provided on the exposure face of the photosensitive element 14 whereby the receiving layer provided by the liquid may be separated as a unit with a screen member from the photosensitive layer. It will, however, be appreciated that a technique of this nature may be employed with a preformed receiving sheet, in which event it is possible to provide the transfer image both in the liquid 21 and in the preformed layer and to separate the preformed layer and screen member from the liquid layer or to separate the liquid layer together with the preformed layer and screen member from the photosensitive layer.

While the practices just described reduce the silver complexes within the liquid layer 21, it is also possible in instances where the screen member 27 is permeable to said liquid to transfer some portion of the silver complexes to the screen member itself and to there carry out their reduction to silver whereby transfer image formation takes place in both the liquid and in the screen member. Where a permeable screen member 27 is employed, it may be desirable to prevent image formation therein and one practice for effecting this result is to provide the inner surface thereof with a suitable impervious subcoat of a transparent plastic such, for example, as that shown in Patent No. 2,614,926, issued October 21, 1952.

As in FIG. 1, the film unit of FIG. 3 is disclosed as undergoing exposure following formation of the sandwich structure. Processing in accordance with the embodiment of the invention illustrated in connection with FIG. 3 proceeds in a manner similar to that described in connection with FIG. 1 and provides equal benefits in the achievement of maintained registration until separation of the screen member 27 and the layer 21 of processing liquid from the sandwich structure. The photosensitive and print-receiving assemblies of the film unit illustrated in FIG. 3 may utilize practices employing the previously mentioned high covering power of the transfer image whereby the sandwich structure may be maintained for viewing purposes. FIG. 4 discloses the screen member 27 together with the liquid layer 21 after separation as a unit from the sandwich structure of FIG. 3 following transfer image formation and with this image indicated by the reference numeral 21a.

It will, of course, be understood that a lenticular type of screen member may be substituted for the additive color filter type screen member 27 of the print-receiving assembly 25 shown in FIG. 3.

After the formation of the sandwich structure, it may in some instances be desirable to delay penetration of the processing liquid into the photosensitive layer and/or into any permeable layer in which the transfer image is formed in whole or in part until the photosensitive layer has either been exposed or is about to be exposed. For this purpose a subcoat or stratum of a slowly permeable material may be coated upon the exposure face of the photosensitive layer and/or on the inner surface of the print-receiving assembly. Materials for the purpose of forming a barrier or subcoat of this nature include gelatin, polyvinyl alcohol and cellulose acetate hydrogen phthalate. The necessary time delay desired may be achieved by the thickness of the barrier subcoat and/or by the permeability of the material used to provide the subcoat. Slowly permeable barriers of this general nature are disclosed in U.S. Patent No. 2,607,685, issued August 19, 1952, and U.S. Patent No. 2,661,293, issued December 1, 1953.

In conventional photographic processes utilizing screen members, the latent image formed upon exposure through the screen lies substantially in a plane which is at a predetermined distance from the exposure face of the screen member, i.e., that face of the screen member which is nearest the object being photographed. Also, in such conventional processes, the final image developed for direct viewing or for projection is always located substantially in the plane of the latent image or in a plane located in a corresponding position. Contrary to this situation, reversal-transfer processes as carried out by this invention form the transfer image in a plane which, while substantially parallel to the plane of the latent image resulting from exposure of the photosensitive layer through the screen member, is nevertheless spaced therefrom and nearer to the screen member than the plane of the latent image.

While the conditions just described in connection with a transfer-reversal process present certain optical problems in connection with exposure and viewing, these may be largely overcome by the appropriate selection and design of the optical systems employed for taking and projection or viewing purposes whereby to provide visible images of acceptable quality.

Some reference has heretofore been made to the availability of well known materials with or without slight modification for the purposes of carrying out the processes set forth herein. In this regard, it is to be noted that the photosensitive assemblies employed in all practices of the invention are commercially available photographic products comprising a conventional film base coated with a conventional silver halide layer. Similarly, the print-receiving assemblies employed by this invention are of well known construction and when desired are easily modified to include a print-receiving or other layer or stratum on one surface thereof by the application of a coating comprising the desired image-receptive or other material onto the screen member.

In the foregoing disclosure silver halide is set forth as a preferred photosensitive material. Other photosensitive materials such, for example, as a heavy metal salt capable of forming a latent image upon photoexposure and capable of development to provide a visible image comprising the metal of said salt, or a photosensitive ferric salt, or a photosensitive diazonium salt or a photosensitive bichromate are available for the formation of a color print where these materials display a suitable color sensitivity. Such photosensitive materials as those just named are also available for the formation of a stereoscopic print. The previously mentioned Patent No. 2,543,-

181 and Patent No. 2,686,716, issued August 14, 1954, disclose the use in a transfer process of those photosensitive materials which have been noted in addition to silver halide.

Also it is pointed out that this invention may be practiced to provide visible images in terms of a dye which is black or a mixture of dyes which together give a black image.

For example, a black dye image may be provided by the use of a conventional photographic coupler or mixture thereof and a color developer having an oxidation product reactable with the coupler or coupler mixture or by the use of a primary or self-coupling developer or mixture of such developers as taught in U.S. Patent No. 2,559,643, issued July 10, 1951, the previously mentioned Patent No. 2,661,293 and U.S. Patent No. 2,698,244, issued December 28, 1954.

Another mechanism for providing black dye images employs in a photosensitive assembly a complete dye having a coupling function, immobilizes the dye in the photosensitive assembly as a function of silver halide development and transfers unreacted dye to image-receptive material where the dye may be employed without reaction to provide the desired image or may undergo reaction, all as taught in the copending application of Howard G. Rogers, Serial No. 358,012, filed May 28, 1953.

Another mechanism for providing a black dye image is set forth in the application of Howard G. Rogers, Serial No. 415,073, filed March 9, 1954, wherein there is employed as a dye material a complete dye which is also a silver halide developer.

Furthermore, as discussed in the just-mentioned application Serial No. 415,073, the utilization of the ability of a tanning developer to harden a carrier material of a layer which contains a black dye or dye mixture which is black may be employed to control the differential transfer of the dye or dye mixture for the purpose of forming a transfer print.

These and other practices for the formation of black dye images are considered as falling within the scope of this invention.

While the formation of images which are black and which comprise silver or a dye or a dye mixture may be named as a preferred practice, it will be understood that the invention may be carried out to provide color prints by the formation of images having a visible appearance other than neutral, for example, brown or sepia.

Additionally, while positive image formation has been heretofore disclosed as the result of the transfer of image-forming components from a photosensitive layer to a stratum or layer of image-receptive material, this invention embraces practices wherein a positive image is formed in the photosensitive layer itself. For example, the photosensitive layer may be a reversal type of silver halide emulsion such as a solarized silver halide emulsion or one of the special mixtures of emulsion and silver precipitating agent or may comprise one of the previously mentioned diazonium salts.

It is generally preferable, but not necessary, to place the developer for the photosensitive material in solution in the processing composition. Alternatively, the developer may be included in any layer included in the film unit and is rendered active following the formation of the sandwich structure wherein the layer of processing liquid is interposed between two layers of the structure.

While embodiments of this invention making use of a lenticular type of screen have been illustrated with the lenticules of said screen forming an outer surface of a film unit, it will be understood that the invention may be carried out with a construction and arrangement wherein the lenticular side of the screen is located inwardly of the outer surface of the sandwich structure. Where this practice is followed, as is well known to the art, there should preferably be one layer between the lenticular type of screen and the photosensitive layer which has a different index of refraction from the material which forms the lenticular screen member. The index of refraction of this last-mentioned layer determines whether the lenticules for the screen member are of concave or convex shape when viewed from the exposure side of the film assembly. Practice of this nature is especially suited to procedures which employ a processing liquid having a silver precipitant incorporated therein. It will also be understood that the screen member itself, under certain conditions, may employ suitably shaped lenticules or minute lens members on each of its outer surfaces.

The importance of this invention is emphasized in its broad concept of employing a liquid processing composition for securing together a screen member and a photosensitive layer in predetermined registration for exposure and processing and for indefinitely maintaining said registration. This practice therefore permits screen processing with conventional photographic sheet materials and does away with the need for specially constructed photographic elements. Additionally, the practices set forth herein are available for the formation of negative as well as positive images.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. In a process for producing visible photographic images in conjunction with a photographic screen having a regular, grid-like array of minute light-transmitting and modifying elements, the steps which comprise positioning said screen in superposed relation with a separate sheet of a photosensitive material, distributing a viscous fluid processing composition in a layer between said screen and the photosensitive sheet, immediately prior to exposure of said sheet, to form a sandwich structure wherein said screen member and said photosensitive sheet are held against relative movement parallel to their facing surfaces by said layer of fluid; while holding said screen and said photosensitive sheet in register against relative movement, directing light through said screen and said layer of fluid to expose said photosensitive sheet and form therein a plurality of latent images, whose distribution is determined by the arrangement of said minute light-transmitting and modifying elements; acting on said exposed photosensitive sheet by means of said fluid processing composition to develop said images, as a result of said development, form an imagewise distribution of transferable image-forming substances, and transferring said image-forming substances by diffusion to a layer supported on said screen to form visible records of said images supported on said screen; and retaining said records in permanent vertical registered relationship to said screen.

2. The process of claim 1 wherein said light-transmitting and modifying elements comprise a lenticular type screen.

3. The process of claim 1 wherein said images are so formed as to comprise two sets of images with the images in one of said sets together providing a composite left-eye stereoscopic image and with the image in the other of said sets together providing a composite right-eye stereoscopic image.

4. The process of claim 1 wherein said images are so formed as to comprise a plurality of sets of images with the images in each said set together providing an individual and a different color record.

5. A process for forming visible images as defined in claim 1 wherein said array of minute light-transmitting and modifying elements provides a color mosaic in the form of an additive type color screen.

6. The process of producing a photographic transfer print comprising the steps of superposing a photosensitive assembly and a second assembly and distributing a layer of viscous processing fluid therebetween to provide a sandwich structure in which said photosensitive and second assemblies are secured in predetermined registered relation by said layer of fluid during subsequent steps, said photosensitive assembly comprising a layer having, as a photosensitive material thereof, a heavy metal salt capable of forming a latent image upon photoexposure and capable of development to produce a visible image comprising the metal of said salt, and said second assembly comprising a photographic screen member in the form of a transparent layer having a regular, grid-like array of minute light-transmitting and modifying elements on at least one side thereof; said processing fluid containing, after permeation of said photosensitive layer, all of the reagents including a developer for said heavy metal salt capable of reducing said salt to the metal thereof and producing an imagewise distribution of image-forming substances transferable to a layer of said sandwich structure to form a positive print of the subject matter of said latent image in said last-mentioned layer; and immediately following, after the formation of said sandwich structure and while maintaining said assemblies in fixed relation, photoexposing said photosensitive layer by light directed through said screen member and said layer of fluid; and by said fluid, developing the latent image in said photosensitive layer and as a result of said development, forming and transferring said image-forming substances by diffusion to a layer of said sandwich to form a positive transfer print in the last-mentioned layer.

7. The process of claim 6 wherein said heavy metal salt comprising said photosensitive material is a silver halide.

8. The process of producing a photographic transfer print comprising the steps of superposing a photosensitive assembly and a second assembly and distributing a viscous fluid processing composition in a layer therebetween to form a sandwich structure in which said photosensitive and second assemblies are secured in predetermined registered relation by said layer of fluid during subsequent steps, said photosensitive assembly comprising a layer having, as a photosensitive material thereof, a heavy metal salt capable of forming a latent image upon photoexposure and capable of development to produce a visible image comprising the metal of said salt, and said second assembly comprising a photographic screen member in the form of a transparent layer having a regular, grid-like array of minute optical elements on at least one side thereof for transmitting and modifying light; said sandwich structure including a photographic processing material comprising a developer for said heavy metal salt capable of reducing said salt to the metal thereof and capable of producing, as a result of said development, a differential imagewise disposition of a transferable image-forming substance throughout said photosensitive layer; immediately following the formation of said sandwich structure and while retaining said assemblies in substantially fixed relation photoexposing the photosensitive layer thereof by light directed through said screen member and said layer of fluid; by said fluid and said processing material, developing the latent image in said photosensitive layer and forming therein said differential disposition of said image-forming substance; transferring said image-forming substance from said photosensitive layer toward said screen member and to a layer of a permeable transparent material constituting an image-receiving layer carried by said screen member and located adjacent that face of said screen member which is the nearer to said photosensitive layer to form a visible transfer print.

9. In a process of producing transfer prints as defined in claim 8, the step of separating said screen member and said image-receiving layer as a unit from said sandwich structure following the transfer of said image-forming substance.

10. The process of producing transfer prints as defined in claim 8 wherein said processing fluid contains a film-forming material adapted to form a solid, permeable, transparent film, and wherein said process includes the step of forming, by means of said film, said image-receiving layer.

11. In a process of producing transfer prints as defined in claim 10, the step of separating as a unit from said sandwich structure said screen member and the image-receiving layer provided by said film.

12. The process of producing photographic transfer prints as defined in claim 8 wherein said photosensitive layer comprises a silver halide and said processing material includes a silver halide developer and a silver halide solvent.

13. The process of producing transfer prints as defined in claim 8 wherein said minute elements for modifying light transmitted through the screen member comprises a multiplicity of lenticules located at said surface of said screen member.

14. The process of producing transfer prints as defined in claim 8 wherein said minute elements for modifying light transmitted through the screen member comprises filter media arranged in a screen pattern and including at least two colors corresponding to the additive colors desired for said screen and located at said surface of said screen member.

15. A process for producing transfer prints as defined in claim 8 wherein said heavy metal salt providing said photosensitive material is silver halide.

16. In a photographic process of the character that employs for taking and for viewing purposes a first layer which is transparent and which is provided on at least one side thereof with a photographic screen for modifying light transmitted through said layer and comprising a regular, grid-like array of a multiplicity of light-transmitting and modifying elements, the steps of forming a sandwich type of structure including a plurality of superposed layers by positioning said first layer in superposed relation with a second layer having on the side thereof in facing relation to said first layer at least a stratum of photosensitive silver halide, and distributing a viscous fluid processing composition in a layer between said first and second layers with said fluid in contact with said silver halide stratum; absorbing said fluid into said stratum, said fluid, when so absorbed, comprising an aqueous solution of a silver halide developer and a silver halide solvent; shortly after forming said sandwich, transmitting light through said first layer, said minute light-transmitting and modifying elements and said layer of fluid to expose said silver halide and form latent image silver halide in said silver halide stratum; and, immediately following exposure of said silver halide, developing said latent image silver halide to silver and forming silver complexes in solution within said fluid; while still maintaining said sandwich type of structure with said layers and stratum in substantially fixed relation, transferring said silver complexes toward the first-mentioned layer by diffusion from said silver halide stratum; and reducing said silver complexes to silver in a layer supported on said first-mentioned layer adjacent that side of said first-mentioned layer which is nearer to said silver halide stratum to provide a reverse image of the latent image formed in said silver halide stratum.

17. A photographic process as defined in claim 16 wherein said fluid processing composition includes a light-transmitting agent which increases viscosity of the composition.

18. A photographic process as defined in claim 16 wherein said silver halide stratum comprises a panchromatic silver halide emulsion.

19. A photographic procss as defined in claim 16 including the step of delaying the exposure of said silver halide stratum for at least a minute fraction of a second after the distribution of said fluid and the formation of said sandwich type structure.

20. In a photographic silver halide diffusion transfer process employing a first fluid-confining layer and a second fluid-confining layer, the steps of strippably securing said layers together in overlying relation and against any appreciable relative movement in a direction parallel to the planes of said layers during subsequent steps by distributing a viscous fluid processing composition between and in contact with the facing surfaces of said fluid-confining layers, said first fluid-confining layer being of light-transmitting character and being provided on at least one side thereof with a photographic screen for modifying light transmitted through said layer, said screen comprising a regular, grid-like array of a multiplicity of minute light-transmitting and modifying elements, said second fluid-confining layer having on the side thereof closest said first layer at least a stratum of photosensitive silver halide, said fluid processing composition comprising an aqueous solution of a silver halide developer and a silver halide complexing agent; after securing together said layers, photoexposing said silver halide stratum by transmitting light through said first layer, said light-transmitting and modifying elements and said layer of fluid to form latent image silver halide in said silver halide stratum, by said fluid, developing said latent silver halide to silver and forming silver complexes in solution in said fluid; while still maintaining said first and second fluid-confining layers against relative movement, transferring from said silver halide stratum at least a part of said silver complexes toward the first-mentioned layer and to a stratum of permeable transparent material constituting an image-receiving stratum supported on the side of said first-mentioned layer which is the nearer to said silver halide stratum; reducing said silver complexes transferred to said image-receiving stratum to provide therein a silver image which is a reverse image of the latent image in said silver halide stratum; and then separating said first fluid-confining layer having said light-transmitting and modifying elements together with said image-receiving stratum as a unit from said second fluid-confining layer and said silver halide stratum carried thereon.

21. A photographic silver halide transfer process as defined in claim 20 wherein said fluid processing composition contains a film-forming material for forming a solid, permeable, transparent film, and wherein said process includes the step of forming, adjacent that face of said first-mentioned layer which is the nearer to said silver halide stratum, a transparent film in a stratum which is adapted to receive at least a part of said silver complexes providing said reverse image and to provide said image-receiving stratum.

22. A photographic process as defined in claim 20 wherein said first-mentioned layer carries a stratum of an image-receptive material on the face thereof that is the nearer to said silver halide stratum, and wherein said process includes the step of transferring at least a part of said silver complexes to said stratum of image-receptive material.

23. A photographic process as defined in claim 20 wherein said means for modifying light transmitted through said first layer comprises a multiplicity of lenticules located at said surface thereof.

24. A photographic process as defined in claim 20 wherein said means for modifying light transmitted through said first layer comprises color filter media arranged in a screen pattern and including at least two colors corresponding to the additive colors desired for said screen with said filter media located at said surface of said first-mentioned layer.

References Cited in the file of this patent

UNITED STATES PATENTS

| | | |
|---|---|---|
| 2,614,926 | Land | Oct. 21, 1952 |
| 2,647,049 | Land | July 28, 1953 |
| 2,661,293 | Land | Dec. 1, 1953 |
| 2,662,822 | Land | Dec. 15, 1953 |
| 2,689,180 | Friedman | Sept. 14, 1954 |
| 2,726,154 | Land | Dec. 6, 1955 |
| 2,819,662 | Land | Jan. 14, 1958 |

FOREIGN PATENTS

| | | |
|---|---|---|
| 814,449 | France | Mar. 15, 1937 |